US010591010B2

(12) United States Patent
Reiser

(10) Patent No.: US 10,591,010 B2
(45) Date of Patent: Mar. 17, 2020

(54) FRICTION LINING MATERIAL AND METHOD FOR PRODUCING A FRICTION LINING MATERIAL

(71) Applicant: SCHUNK HOFFMANN CARBON TECHNOLOGY AG, Bad Goisem (AT)

(72) Inventor: Klaus Reiser, Bad Ischl (AT)

(73) Assignee: SCHUNK HOFFMAN CARBON TECHNOLOGY AG, Bad Goisern (AT)

(*) Notice: Subject to any disclaimer, the term of this patent is extended or adjusted under 35 U.S.C. 154(b) by 1 day.

(21) Appl. No.: 15/550,577

(22) PCT Filed: Jan. 19, 2016

(86) PCT No.: PCT/EP2016/051016
§ 371 (c)(1),
(2) Date: Aug. 11, 2017

(87) PCT Pub. No.: WO2016/128186
PCT Pub. Date: Aug. 18, 2016

(65) Prior Publication Data
US 2018/0266506 A1     Sep. 20, 2018

(30) Foreign Application Priority Data
Feb. 13, 2015    (EP) .................... 15155069

(51) Int. Cl.
| F16D 69/02 | (2006.01) |
| C04B 41/88 | (2006.01) |
| C04B 41/00 | (2006.01) |
| C04B 41/51 | (2006.01) |
| C22C 32/00 | (2006.01) |
| C04B 35/532 | (2006.01) |
| C04B 35/52 | (2006.01) |
| C04B 41/50 | (2006.01) |
| C04B 41/87 | (2006.01) |
| C04B 111/00 | (2006.01) |

(52) U.S. Cl.
CPC .......... *F16D 69/025* (2013.01); *C04B 35/522* (2013.01); *C04B 35/532* (2013.01); *C04B 41/009* (2013.01); *C04B 41/5025* (2013.01); *C04B 41/5094* (2013.01); *C04B 41/5096* (2013.01); *C04B 41/5127* (2013.01); *C04B 41/5155* (2013.01); *C04B 41/87* (2013.01); *C04B 41/88* (2013.01); *C22C 32/0084* (2013.01); *F16D 69/023* (2013.01); *C04B 2111/00362* (2013.01); *C04B 2235/3217* (2013.01); *C04B 2235/3826* (2013.01); *C04B 2235/48* (2013.01); *C04B 2235/5436* (2013.01); *C04B 2235/616* (2013.01); *C04B 2235/77* (2013.01); *F16D 2200/003* (2013.01); *F16D 2200/006* (2013.01); *F16D 2200/0047* (2013.01); *F16D 2200/0052* (2013.01); *F16D 2200/0082* (2013.01)

(58) Field of Classification Search
CPC ................. F16D 69/025; F16D 69/023; F16D 2200/003; F16D 2200/0047; F16D 2200/0052; F16D 2200/006; F16D 2200/0082; C04B 41/87; C04B 35/522; C04B 35/532; C04B 41/88; C04B 41/009; C04B 41/5127; C04B 41/5155; C04B 41/5025; C04B 41/5094; C04B 41/5096; C04B 2111/00362; C04B 2235/48; C04B 2235/5436; C04B 2235/77; C04B 2235/3217; C04B 2235/3826; C04B 2235/616; C22C 32/0084
See application file for complete search history.

(56) References Cited

U.S. PATENT DOCUMENTS

| 2,215,572 | A | | 9/1940 | Wilson | |
| 3,619,430 | A | * | 11/1971 | Hiratsuka | ............... C04B 35/52 |
| | | | | | 264/29.1 |
| 6,936,341 | B2 | * | 8/2005 | Huner | ................... C04B 35/565 |
| | | | | | 260/998.13 |
| 7,045,207 | B2 | * | 5/2006 | Huner | ................... C04B 35/653 |
| | | | | | 428/293.1 |

FOREIGN PATENT DOCUMENTS

| DE | 1525334 B1 * | 9/1971 | .......... F16D 25/123 |
| DE | 19711829 C1 | 9/1998 | |
| DE | 102009053737 A1 | 5/2011 | |
| EP | 0968150 B1 | 8/2001 | |
| EP | 1457703 A1 | 9/2004 | |
| EP | 2213902 A2 | 8/2010 | |
| KR | 20000035815 A | 6/2000 | |
| WO | 2014203142 A1 | 12/2014 | |

OTHER PUBLICATIONS

PCT International Preliminary Report on Patentability, PCT/EP2016/051016, dated Aug. 15, 2017, 17 pages.
International Search Report dated Aug. 11, 2016 in connection with PCT/EP2016/051016.
Intellectual Property India, Examination Report, Application No. 201727032262, Oct. 14, 2019, 6 pages.

* cited by examiner

*Primary Examiner* — Anthony J Green
(74) *Attorney, Agent, or Firm* — Quarles & Brady LLP

(57) ABSTRACT

The invention relates to a method for producing a friction lining material as well as a friction lining material having a porous body, whose pores are filled with a filling material, said porous body being formed on the basis of petroleum coke.

17 Claims, 2 Drawing Sheets

FRICTION LINING MATERIAL AND METHOD FOR PRODUCING A FRICTION LINING MATERIAL

CROSS-REFERENCE TO RELATED APPLICATIONS

This application represents the national stage entry of PCT International Application No. PCT/EP2016/051016 filed on Jan. 19, 2016 and claims priority to European Patent Application No. 15155069.6 filed on Feb. 13, 2015. The contents of this application are hereby incorporated by reference as if set forth in their entirety herein.

The present invention relates to a friction lining material having a porous body whose pores are filled with a filling material. The present invention further relates to a friction lining made of the friction lining material as well as to a method for producing a friction lining material.

From DE 197 11 829 C1, a method for producing a friction lining material is known which comprises a porous body whose pores are filled by the porous body having been infiltrated by a silicon melt. The known friction lining material is produced based on a mix of fiber bundles, filling materials and a binding agent, which can be pyrolized, all three of which are compacted to form a green body and subsequently pyrolized.

A prerequisite for producing the known friction lining material is providing suitable short-fiber bundles made of carbon which serve for reinforcing the ceramic substance made of silicon and thus for producing a composite ceramic.

The object of the present invention is to propose a friction lining material which can be produced particularly inexpensively and which moreover has a particularly low tendency to stick and slip, often referred to as the "stick-and-slip effect", with respect to known friction lining materials.

According to the invention, the porous body of the friction lining material is formed on the basis of petroleum coke. The friction lining material according to the invention thus comprises a porous body which consists of more than 50 wt % of petroleum coke. Moreover, the porous body of the friction lining material according to the invention can, for example, also comprise portions of pitch coke, graphite or soot in addition to petroleum coke.

Petroleum coke can be produced significantly more inexpensively in comparison to carbon fibers from an industrial point of view. Incidentally, using petroleum coke for forming the porous body also allows using less additional filling materials or even omitting additional filling materials, such as soot or graphite in particular, which, when producing the known friction lining material, are required for the cohesion of the fiber bundles when producing the green body so that the friction lining material according to the invention can be produced more easily and in particular more cost-efficiently.

In preferred embodiments, the friction lining material comprises a filling material which is formed as a material containing metal, ceramic or semimetal so that, inter alia, the operating conditions of the friction lining material can be particularly adjusted via the chosen filling materials.

Preferably, the friction lining material has a porosity of 5 to 50%, a bulk density of 1.5 to 5 g/cm$^3$ and a metal portion of 5 to 70 wt %.

It is particularly preferred if the friction lining material has a porosity of 10 to 30%, a bulk density of 2.0 to 2.5 g/cm$^3$ and a metal portion of 10 to 50 wt %.

In a particularly preferred embodiment, the friction lining material comprises a porous body having a porosity of 15 to 20%, a bulk density of 2.2 to 2.4 g/cm$^3$ and a copper portion of 20 to 30 wt %. A friction factor of $\mu=0.36$ can thus be adjusted when pairing materials with metal.

In another particular embodiment, the friction lining material comprises to a porous body having a porosity of 25 to 30%, a bulk density of 2.2 to 2.4 g/cm$^3$ and a copper portion of 25 to 45 wt %. A friction factor of $\mu=0.44$ can thus be adjusted when pairing materials with metal.

In another particular embodiment, the friction lining material comprises a porous body having a porosity of 10 to 20%, a bulk density of 1.9 to 2.4 g/cm$^3$ and a metal portion formed by an aluminum alloy of 5 to 25 wt %. A friction factor of $\mu=0.11$ can be adjusted when pairing materials with metal.

In the method according to the invention, in order to produce a friction lining material, a porous body is first produced such that a mixture comprising petroleum coke and a binding agent containing carbon is compacted and subsequently pyrolized at a temperature between 800° and 1500° C. Subsequently, pores formed in the porous body are filled with a molten filling material.

Preferably, a synthetic resin, tar or pitch is used as a binding agent.

If a ceramic material, in particular a material containing silicon carbide or aluminum oxide, is used as a filling material, the result of the method will be a composite ceramic material whose friction factor and wear properties are essentially determined by the ceramic parts.

Should a filling material be used, which contains a metal, in particular copper, or a metal alloy, in particular an aluminum alloy, the friction coefficient and the wear properties are essentially determined by the metallic parts of the friction lining material.

Should a semimetal, in particular a material containing boron or silicon, be used, the friction coefficient and the wear properties are essentially determined by the choice of the used semimetal.

As can be seen in the preferred embodiments described above, the friction lining material defined in claim 1 or the method defined in claim 9 comprises the advantage of definitely making a friction lining material possible whose friction coefficient and wear properties can be defined by the choice of the filling material seeming most suitable for the respective intended use based on a porous body formed by petroleum coke and formed independently of the filling material.

Independently of the respectively adjusted friction coefficient, the friction lining material according to the invention comprises a static friction coefficient barely influenced by a dynamic load due to its porous body formed on the basis of petroleum coke, said porous body basically serving as a matrix for a defined accommodation of the filling material. By this means, braking forces or retaining forces, which can be reproduced independently of dynamic operating conditions when using the friction lining material according to the invention, can be enabled on breaking devices equipped with the friction lining material realized according to the invention.

In the following, special advantages in the material behavior of the friction lining material according to the invention are illustrated by way of a friction curve, illustrated in an exemplary manner, upon tearing away after the friction lining material according to the invention has been dynamically stressed as compared to a conventional friction lining material.

When "tearing away", the friction factor is determined starting from the tangential force, which needs to be mustered in order to loosen friction partners from a stationary relative arrangement, in which the friction partners cohere to each other, so that the friction partners slide atop of each other. In this process, the static friction factor is attained at the moment of tearing away.

The friction curves are illustrated in FIGS. 1 and 2, respectively, the essentially horizontal friction curves representing the dynamic friction factor or sliding friction factor, which is attained at a continuous relative movement of the friction partners, and the maximum values of the friction curves representing the static friction factor, which is attained when friction partners, which form a friction pairing and which are each formed by a friction lining piece arranged on a steel plate, are pressurized by a tangential force, namely a force parallel to the friction plane, from a standstill.

Figure 1:
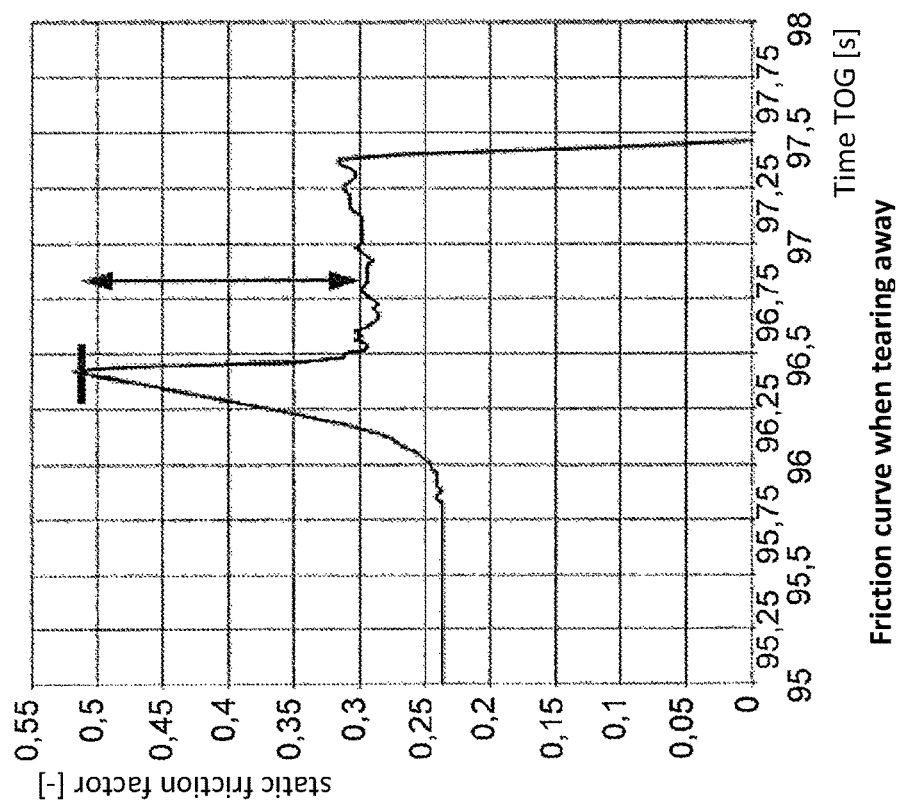
FIG. 1 illustrates the friction curve in a friction pairing between a conventional organic friction lining and a steel plate.
Figure 2:
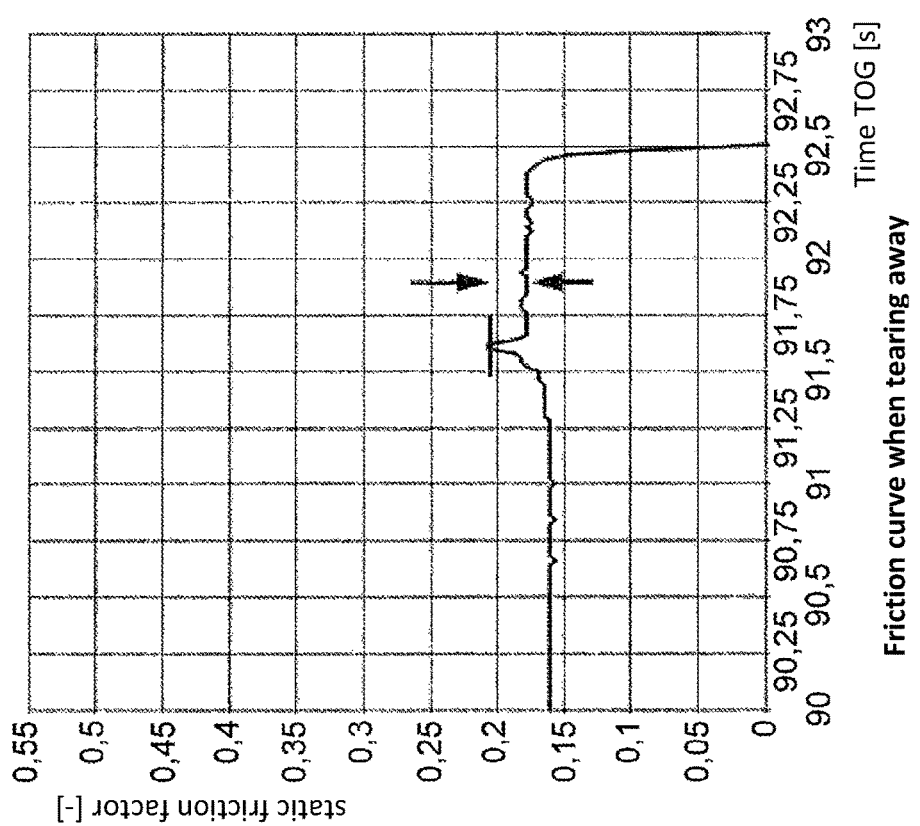
FIG. 2 illustrates the friction curve in a friction pairing between a friction lining according to the invention and a steel plate.

As the two FIGS. 1 and 2 clearly illustrate in comparison to each other, the friction curve shows an extreme increase of the friction factor in a conventional friction lining material when being converted from a dynamic to a static friction behavior, i.e. when the friction lining is pressurized from a standstill with a continuously increasing tangential force so that it "tears away" from the static friction after a continuous relative movement on the steel plate. Moreover, FIG. 1 clearly illustrates that a dynamic friction factor which is significantly larger than the dynamic friction factor before tearing away is attained after tearing away when the dynamic operation is continued.

In comparison thereto, a friction curve can be identified in the friction lining material according to the invention, the increase of the dynamic friction factor on the static friction factor being significantly lower in said friction curve and a dynamic friction factor being attained after tearing away in said friction curve, said dynamic friction factor being only slightly higher than the dynamic friction factor before tearing away.

The noticeable slight difference between the static friction factor and the dynamic friction factor in the friction lining material according to the invention underlines the low tendency to "stick and slip" so that oscillations, which are caused by sticking and slipping and which lead to disruptive noise emissions, can be prevented. Such noise emissions occur in particular in the operation of wind energy plants which are provided with an azimuth adjustment for the rotor arranged on the car. An azimuth braking device is provided for fixing the pivot position of the car and comprises brake calipers comprising brake pads, i.e. friction linings, said brake calipers interacting with annular brake disks made of steel.

In addition to the advantage of a low tendency to "stick and slip", the friction lining material according to the invention enables realizing an essentially constant or only slightly dispersed braking force due to the dynamic friction factor which slightly changes during operation, although the slightly dispersing braking force, independent of the usage conditions of the friction lining material according to the invention, always is of an advantage whenever a brake force is controlled, as in ABS systems, for example.

In order to produce a first exemplary embodiment of a friction lining material, a porous body formed on the basis of petroleum coke having a middle particle size $D_{50}$ of 100 µm is mixed with a phenolic resin as a binding agent, is compacted as a molded piece for producing a porous body and subsequently pyrolized at 1400° C. The result is a porous body having a bulk density of 1.7 g/cm$^3$ and a porosity of 17%. After the porous body has been infiltrated by molten copper at a temperature of 1300° C. and a pressure of 7.5 MPa, the result is a friction lining material having a bulk density of 2.27 g/cm$^3$, a metal portion of 25% and a friction coefficient of µ=0.36.

According to another exemplary embodiment of a friction lining material, a porous body formed on the basis of petroleum coke having a middle pore size $D_{50}$ of 125 µm which is mixed with pitch as a binding agent is produced and compacted into a molded piece. After a pyrolysis has been conducted at 1400° C., a porous body having a bulk density of 1.5 g/cm$^3$ and a porosity of 27% is the result. After the porous body has been infiltrated by molten copper at a temperature of 1300° C. and a pressure of 7.5 MPa, the result is a friction lining material having a bulk density of 2.5 g/cm$^3$, a metal portion of 42% and a friction coefficient of µ=0.44.

According to a third exemplary embodiment of a friction lining material, a porous body formed on the basis of petroleum coke having a middle particle size $D_{50}$ of 30 µm is produced, a phenolic resin being used as a binding agent and the realized mixture being compacted to form a molded piece and subsequently being pyrolized at 950° C. The result is a porous body having a bulk density of 1.72 g/cm$^3$ and a porosity of 16%.

After the porous body has been infiltrated by a molten aluminum alloy (AlSil2) at a temperature of 600° C. and a pressure of 10 MPa, a porous body having a bulk density of 1.98 g/cm$^3$, a metal portion of 17% and friction factor of µ=0.2.

According to a fourth exemplary embodiment of a friction lining material, a porous body formed on the basis of petroleum coke having a particle size $D_{50}$ of 30 µm is produced, a phenolic resin being added to the porous body so as to produce a mixture. After the mixture has been compacted to form a molded piece and has been pyrolized at a temperature of 950° C., the thus formed porous body is graphited in another step at a temperature of 3000° C. Thus, a porous body having a bulk density of 1.85 g/cm$^3$ and a porosity of 17% is produced.

After the porous body has been infiltrated by a molten aluminum alloy (AlSil2) at a temperature of 600° C. and a pressure of 10 MPa, a friction lining material having a bulk density of 2.19 g/cm$^3$, a metal portion of 15.5% and a friction factor of µ=0.11 is the result.

The invention claimed is:

1. A friction lining material having a porous body, whose pores are filled with a filling material, wherein the filling material comprises a metal portion of at least 5% wt and wherein the porous body has a porosity of 5 to 50%, a bulk density of 1.5 to 5 g/cm$^3$ and comprises more than 50 wt % of petroleum coke.

2. The friction lining material according to claim 1, wherein the friction lining material comprises a porous body having a porosity of 10 to 30%, a bulk density of 2.0 to 2.5 g/cm$^3$ and a metal portion of at least 10 wt %.

3. The friction lining material according to claim 1, wherein the friction lining material comprises a porous body having a porosity of 15 to 20%, a bulk density of 2.2 to 2.4 g/cm$^3$ and wherein the metal portion comprises a copper portion of 20 to 30 wt %.

4. The friction lining material according to claim 1, wherein the friction lining material comprises a porous body having a porosity of 25 to 30%, a bulk density of 2.2 to 2.4 g/cm$^3$ and wherein the metal portion comprises a copper portion of 25 to 45 wt %.

5. The friction lining material according to claim 1, wherein the friction lining material comprises a porous body having a porosity of 10 to 20%, a bulk density 1.9 to 2.4 g/cm$^3$ and the metal portion comprises an aluminum alloy of 5 to 25 wt %.

6. A friction lining comprised of a friction lining material according to claim 1.

7. A method for producing a friction lining material, comprising the steps of compacting a mixture comprising petroleum coke and a binding agent containing carbon and subsequently pyrolizing the mixture at a temperature between 800° and 1500° C. in order to produce a porous body, then graphiting the porous body, and subsequently filling pores formed in the porous body with a molten filling material, wherein the molten filling material comprises a ceramic material.

8. The method according to claim 7, wherein synthetic resin, tar or pitch is used as a binding agent.

9. The method according to claim 7, wherein the filling material further comprises a semimetal.

10. The method according to claim 7, wherein the filling material further comprises a metal.

11. The method according to claim 7, wherein the ceramic material comprises silicon carbide or aluminum oxide.

12. The method according to claim 10, wherein the metal comprises copper.

13. The method according to claim 10, wherein the metal comprises a metal alloy.

14. The method according to claim 10, wherein the metal comprises an aluminum alloy.

15. A method for producing a friction lining material, comprising the steps of compacting a mixture comprising petroleum coke and a binding agent containing carbon and subsequently pyrolizing the mixture at a temperature between 800° and 1500° C. in order to produce a porous body, then graphiting the porous body, and subsequently filling pores formed in the porous body with a molten filling material, wherein the molten filling material comprises a semimetal material.

16. The method according to claim 15, wherein the filling material further comprises a semimetal.

17. The method according to claim 15, wherein the semimetal material comprises a material containing boron or silicon.

\* \* \* \* \*

UNITED STATES PATENT AND TRADEMARK OFFICE
CERTIFICATE OF CORRECTION

PATENT NO. : 10,591,010 B2
APPLICATION NO. : 15/550577
DATED : March 17, 2020
INVENTOR(S) : Klaus Reiser Page 1 of 1

It is certified that error appears in the above-identified patent and that said Letters Patent is hereby corrected as shown below:

In the Claims

Column 6, Claim 16, Line 20, "a semimetal." should be --a ceramic material.--.

Signed and Sealed this
Sixteenth Day of June, 2020

Andrei Iancu
*Director of the United States Patent and Trademark Office*